US012639562B2

(12) United States Patent
Vrudhula et al.

(10) Patent No.: US 12,639,562 B2
(45) Date of Patent: May 26, 2026

(54) QUANTIZED NEURAL NETWORK CIRCUIT

(71) Applicants: Sarma Vrudhula, Chandler, AZ (US); Ankit Wagle, Tempe, AZ (US); Gian Singh, Tempe, AZ (US)

(72) Inventors: Sarma Vrudhula, Chandler, AZ (US); Ankit Wagle, Tempe, AZ (US); Gian Singh, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 19/179,588

(22) Filed: Apr. 15, 2025

(65) Prior Publication Data

US 2025/0322226 A1 Oct. 16, 2025

Related U.S. Application Data

(60) Provisional application No. 63/634,372, filed on Apr. 15, 2024.

(51) Int. Cl.
G06N 3/063 (2023.01)
G06N 3/0495 (2023.01)

(52) U.S. Cl.
CPC ........... G06N 3/063 (2013.01); G06N 3/0495 (2023.01)

(58) Field of Classification Search
CPC ....... G06N 3/063; G06N 3/0495; G06N 3/045
See application file for complete search history.

(56) References Cited

U.S. PATENT DOCUMENTS

| | | | | |
|---|---|---|---|---|
| 6,636,881 | B1* | 10/2003 | Fujiwara | G06T 9/005 |
| | | | | 708/210 |
| 7,064,685 | B1* | 6/2006 | Xue | H04L 25/4908 |
| | | | | 341/95 |
| 2016/0323182 | A1* | 11/2016 | Segal | H04L 45/56 |
| 2020/0086480 | A1* | 3/2020 | Haddadin | B25J 9/1633 |
| 2021/0150323 | A1* | 5/2021 | Turek | G06N 3/063 |
| 2022/0121915 | A1* | 4/2022 | Wagle | G06N 3/063 |

OTHER PUBLICATIONS

Singh et al, "CIDAN-XE: Computing in DRAM with Artificial Neurons" (Year: 2022).*
Wagle et al, "An ASIC Accelerator for QNN with Variable Precision and Tunable Energy-Efficiency" (Year: 2023).*

(Continued)

*Primary Examiner* — Farley Abad
(74) *Attorney, Agent, or Firm* — Womble Bond Dickinson (US) LLP

(57) ABSTRACT

A quantized neural network circuit. The circuit may include a neuron processing element, the neuron processing element including a first neuron cluster and a second neuron cluster. The first neuron cluster may include: a first binary neuron, having a first input network with a first number of inputs; a second binary neuron, having a first input network with a second number of inputs, the second number being different from the first number; a plurality of multiplexers, each having an output connected to a respective input of the inputs of the first input network of the first binary neuron; and a plurality of flip-flops, each having an output connected to an input of a respective multiplexer of the plurality of multiplexers.

20 Claims, 16 Drawing Sheets

(56) References Cited

OTHER PUBLICATIONS

Ahanonu, E., "Lossless Image Compression Using Reversible Integer Wavelet Transforms and Convolutional Neural Networks", Thesis for the Faculty of the Department of Electrical and Computer Engineering, 2018, pp. 1-87.

Al Bahou, A., et al., "XNORBIN: A 95 TOp/s/W Hardware Accelerator for Binary Convolutional Neural Networks", 2018, 3 pages.

Andri, R., et al., "YodaNN: An Architecture for Ultralow Power Binary-Weight CNN Acceleration", Transactions on Computer-Aided Design of Integrated Circuits and Systems, 2018, pp. 48-60, vol. 31, No. 1.

Appel, K., et al., "The Four-Color Problem", Mathematics Today Twelve Informal Essays, 1978, 2 pages, Conference Board of the Mathematical Sciences.

Balasubramanian, M., et al., "CRIMSON: Compute-Intensive Loop Acceleration by Randomized Iterative Modulo Scheduling and Optimized Mapping on CGRAs", Transactions on Computer-Aided Design of Integrated Circuits and Systems, 2020, pp. 3300-3310, vol. 39, No. 11.

Balasubramanian, M., et al., "Laser: A Hardware/Software Approach to Accelerate Complicated Loops on CGRAs", Design, Automation and Test in Europe, 2018, pp. 1069-1074.

Bobba, S., et al., "Current-Mode Threshold Logic Gates", 2000, pp. 235-240.

Boutros, A., et al., "Build Fast, Trade Fast: FPGA-based High-Frequency Trading using High-Level Synthesis", 2017, 6 pages.

Caneshce, M., et al., "Traversal: A Fast and Adaptive Graph-Based Placement and Routing for CGRAs", Transactions on Computer-Aided Design of Integrated Circuits and Systems, 2021, pp. 1600-1612, vol. 40, No. 8.

Chen, Y., et al., "Reducing Memory Access Conflicts with Loop Transformation and Data Reuse on Coarse-grained Reconfigurable Architecture", Design, Automation and Test in Europe Conference, 2021, pp. 124-129.

Chen, Y-H., et al., "Eyeriss: A Spatial Architecture for Energy-Efficient Dataflow for Convolutional Neural Networks", ACM/IEEE 43rd Annual International Symposium on Computer Architecture, 2016, pp. 367-379, Computer Society.

Cheng, Y., et al., "Model Compression and Acceleration for Deep Neural Networks", Deep Learning for Visual Understanding: Part 2, 2018, pp. 126-136, Signal Processing Magazine.

Dave, S., et al., "dMazeRunner: Executing Perfectly Nested Loops on Dataflow Accelerators", ACM Transactions on Embedded Computing Systems, 2019, 27 pages, vol. 18, No. 5s, Article 70.

Dave, S., et al., "RAMP: Resource-Aware Mapping for CGRAs", DAC '18, 2018, 6 pages, Association for Computing Machinery.

Fan, D., et al., "Energy Efficient In-Memory Binary Deep Neural Network Accelerator with Dual-Mode SOT-MRAM", IEEE 35th International Conference on Computer Design, 2017, pp. 609-612, Computer Society.

Fedus, W., et al., "Switch Transformers: Scaling to Trillion Parameter Models with Simple and Ecient Sparsity", Journal of Machine Learning Research, 2022, pp. 1-39.

Garland, J., et al., "Low Complexity Multiply-Accumulate Units for Convolutional Neural Networks with Weight-Sharing", ACM Transactions on Architecture and Code Optimization, 2018, 24 pages, vol. 15, No. 3, Article 31.

Guo, X., et al., "Fast, Energy-Efficient, Robust, and Reproducible Mixed-Signal Neuromorphic Classifier Based on Embedded NOR Flash Memory Technology", 2017, 4 pages.

Hamzeh, M., et al., "Branch-Aware Loop Mapping on CGRAs", DAC '14, 2014, 6 pages.

Hamzeh, M., et al., "EPIMap: Using Epimorphism to Map Applications on CGRAs", DAC, 2012, pp. 1284-1291.

Kim, S., et al., "A Power-Efficient CNN Accelerator With Similar Feature Skipping for Face Recognition in Mobile Devices", Transactions on Circuits and Systems—1: Regular Papers, 2020, pp. 1181-1193, vol. 67, No. 4.

Knag, P., et al., "A 617-TOPS/W All-Digital Binary Neural Network Accelerator in 10-nm FinFET CMOS", Journal of Solid-State Circuits, 2021, pp. 1082-1092, vol. 56., No. 4.

Ku, D., et al., "Relative Scheduling under Timing Constraints", Center for Integrated Systems, 1991, pp. 59-64, 27th ACM/IEEE Design Automation Conference.

Landwehr, B., et al., "OSCAR: Optimum Simultaneous Scheduling, Allocation and Resource Binding Based on Integer Programming", 1994, pp. 1-55, No. 484.

Leshner, S., et al., "Design of a robust, high performance standard cell threshold logic family for DSM technology", 22nd International Conference on Microelectronics, 2010, 4 pages.

Li, et al., "Design of Binary Convolution Operation Circuit for Binarized Neural Networks Using Single-Flux-Quantum Circuit", IEEE Transactions on Applied Superconductivity, 2022, 5 pages, vol. 32, No. 4.

Liu, Z-G, et al., "S2TA: Exploiting Structured Sparsity for Energy-Efficient Mobile CNN Acceleration", IEEE International Symposium on High-Performance Computer Architecture (HPCA), 2022, pp. 573-586.

Luo, C., et al., "FullReuse: A Novel ReRAM-based CNN Accelerator Reusing Data in Multiple Levels", The 5th International Conference on Integrated Circuits and Microsystems, 2020, pp. 177-183.

Luo, J-H., et al., "ThiNet: A Filter Level Pruning Method for Deep Neural Network Compression", CVF, 2017, pp. 5058-5066.

Ma, Y. et al., "ALAMO: FPGA Acceleration of Deep Learning Algorithms with a Modularized RTL Compiler", 2017, Elsevier, 12 pages.

Ma, Y. et al., "Automatic Compilation of Diverse CNNs Onto High-Performance FPGA Accelerators", IEEE Transactions on Computer-Aided Design of Integrated Circuits and Systems, 2018, pp. 424-437, vol. 39, No. 2.

Ma, Y. et al., "Optimizing the Convolution Operation to Accelerate Deep Neural Networks on FPGA", IEEE Transactions on Very Large Scale Integration (VLSI) Systems, 2018, pp. 1354-1367, vol. 26, No. 7.

Ma, Y. et al., "Performance Modeling for CNN Inference Accelerators on FPGA", IEEE Transactions on Computer-Aided Design of Integrated Circuits and Systems, 2019, pp. 843-856, vol. 39, No. 4.

Moons, B. et al., "BinarEye: An Always-On Energy-Accuracy-Scalable Binary CNN Processor With All Memory On Chip In 28nm CMOS", 2018, IEEE Xplore, 4 pages.

Mozaffari, S. et al., "Maximizing the Number of Threshold Logic Functions Using Resistive Memory", IEEE Transactions on Nanotechnology, 2018, pp. 897-905, vol. 17, No. 5.

Nagel, M. et al., "A White Paper on Neural Network Quantization", arXiv:2106.08295v1, 2021, pp. 1-27, www.arXiv.org.

Nakahara, H. et al., "A Memory-Based Realization of a Binarized Deep Convolutional Neural Network", IEEE Xplore, 2016, 4 pages.

Nguyen, V. et al., "A 1Mb Mixed-Precision Quantized Encoder for Image Classification and Patch-Based Compression", IEEE Transactions on Circuits and Systems for Video Technology, 2022, pp. 5581-5594, vol. 32, No. 8.

Nurvitadhi, E. et al., "Accelerating Binarized Neural Networks: Comparison of FPGA, CPU, GPU, and ASIC", IEEE Xplore, 2016, 8 pages.

Nurvitadhi, E. et al., "Can FPGAs Beat GPUs in Accelerating Next-Generation Deep Neural Networks?", ACM, 2017, pp. 5-14.

Rastegari, M. et al., "XNOR-Net: ImageNet Classification Using Binary Convolutional Neural Networks", Springer International Publishing, 2016, pp. 525-542.

Scherer, M. et al., "CUTIE: Beyond PetaOp/s/W Ternary DNN Inference Acceleration with Better-Than-Binary Energy Efficiency", IEEE Transactions on Computer-Aided Design of Integrated Circuits and Systems, 2022, pp. 1020-1033, vol. 41, No. 4.

Strubell, E. et al., "Energy and Policy Considerations for Modern Deep Learning Research", The Thirty-Fourth AAAI Conference on Artificial Intelligence (AAAI-20), 2020. pp. 13693-13696.

(56)                  References Cited

OTHER PUBLICATIONS

Suh, H-S. et al., "Algorithm-hardware Co-optimization for Energy-efficient Drone Detection on Resource-constrained FPGA", ACM Transactions on Reconfigurable Technology and Systems, 2023, pp. 33:1-33:25, vol. 16, No. 2.

Sun, X. et al., "Fully Parallel RRAM Synaptic Array for Implementing Binary Neural Network with (+1, −1) Weights and (+1, 0) Neurons", IEEE Xplore, 2018, pp. 574-579.

Sze, V. et al., "Efficient Processing of Deep Neural Networks: A Tutorial and Survey", Proceedings of the IEEE, 2017, pp. 2295-2329, vol. 105, No. 12.

Trusov, A. et al., "Fast Implementation of 4-bit Convolutional Neural Networks for Mobile Devices", 2020 25th International Conference on Pattern Recognition (ICPR), 2021, pp. 9897-9903.

Wagle, A. et al., "A Configurable BNN ASIC using a Network of Programmable Threshold Logic Standard Cells", 2020 IEEE 38th International Conference on Computer Design (ICCD), 2020, pp. 433-440.

Wagle, A. et al., "A Novel ASIC Design Flow Using Weight-Tunable Binary Neurons as Standard Cells", IEEE Transactions on Circuits and Systems—I: Regular Papers, 2022, pp. 2968-2981, vol. 69, No. 7.

Wang, Y. et al., "CNN Hyperparameter Optimization Based on CNN Visualization and Perception Hash Algorithm", 2020 19th International Symposium on Distributed Computing and Applications for Business Engineering and Science (DCABES), 2020, pp. 78-82.

Wang, Y. et al., "On Stabilization of Quantized Sampled-Data Neural-Network-Based Control Systems", IEEE Transactions on Cybernetics, 2017, pp. 3124-3135, vol. 47, No. 10.

Wang, Z. et al., "Automatic Hyperparameter Tuning of Machine Learning Models under Time Constraints", 2018 IEEE International Conference on Big Data (Big Data), 2018, pp. 4967-4973.

Wu, J. et al., "Quantized Convolutional Neural Networks for Mobile Devices", CVPR, 2016, pp. 4820-4828.

Yang, T-J. et al., "Designing Energy-Efficient Convolutional Neural Networks using Energy-Aware Pruning", CVPR, 2017, pp. 5687-5695.

Yue, J. et al., "A 65nm Computing-in-Memory-Based CNN Processor with 2.9-to-35.8TOPS/W System Energy Efficiency Using Dynamic-Sparsity Performance-Scaling Architecture and Energy-Efficient Inter/Intra-Macro Data Reuse", ISSCC 2020 / Session 14 / Low-Power Machine Learning, 2020, pp. 234-236.

Zhang, J. et al., "A High Energy Efficiency and Low Resource Consumption FPGA Accelerator for Convolutional Neural Network", 2021 the 7th International Conference on Computer and Communications, 2021, pp. 1278-1283.

* cited by examiner

| Notation | Description |
|---|---|
| $(s_v, e_v)$ | Lifetime of storage of node $v$. |
| $d_u$ | Delay of a primitive operation ($1 \leq d_u \leq 2$) cycles. |
| $b_u$ | Bits needed to store the output of a primitive operation. |
| $\chi_{u,r,t}$ | Value is 1 if output of node $v$ is stored in register $r$ at time $t$. |
| $\rho_{v,r}$ | Value is 1 if output of node $v$ is stored in register $r$ at any time. |
| $\tau_{v,t}$ | Value is 1 if output of node $v$ is available at time $t$ in any of the local registers. |
| $u \prec v$ | $u$ is the immediate predecessor of $v$. |
| $E$ | Makespan (execution time) of $G_P$ on TULIP-PE. |

Table I

FIG. 4C

| Neuron Inputs (N) | Decision Variables | Time (Sec) |
|---|---|---|
| 64 | 6.88E+03 | 0.04 |
| 128 | 2.81E+04 | 0.12 |
| 256 | 1.14E+05 | 0.49 |
| 512 | 4.56E+05 | 2.14 |
| 1024 | 1.83E+06 | 9.32 |
| 2048 | 7.33E+06 | 41.82 |
| 4096 | 2.93E+07 | 216.46 |

Table II

FIG. 5B

|  | Gate complexity | Delay complexity |
|---|---|---|
| 1 MAC Unit | $\mathcal{O}(mn)$ | $\mathcal{O}(N)$ |
| 1 TULIP-PE | $\mathcal{O}(1)$ | $\mathcal{O}(mnN)$ |
| Row of $C$ MAC units | $\mathcal{O}(Cmn)$ | $\mathcal{O}(N/C)$ |
| Grid of $R \times C$ TULIP-PEs | $\mathcal{O}(CR)$ | $\mathcal{O}(mnN/CR)$ |

FIG. 8B

QUANTIZED NEURAL NETWORK CIRCUIT

CROSS-REFERENCE TO RELATED APPLICATION(S)

The present application claims priority to and the benefit of U.S. Provisional Application No. 63/634,372, filed Apr. 15, 2024, entitled "QUANTIZED NEURAL NETWORK CIRCUIT", the entire content of which is incorporated herein by reference.

GOVERNMENT LICENSE RIGHTS

This invention was made with government support under 1361926 and 1701241 awarded by the National Science Foundation. The government has certain rights in the invention.

FIELD

One or more aspects of embodiments according to the present disclosure relate to neural networks, and more particularly to a quantized neural network circuit.

BACKGROUND

Deep neural networks (DNNs) have numerous applications, such as pattern recognition and data mining, including speech recognition, image classification, object recognition, autonomous vehicles and robotics, and recommendation systems. The power consumption of such neural networks may be significant.

It is with respect to this general technical environment that aspects of the present disclosure are related.

SUMMARY

According to an embodiment of the present disclosure, there is provided a system, including: a neuron processing element, the neuron processing element including a first neuron cluster and a second neuron cluster, the first neuron cluster including: a first binary neuron, having a first input network with a first number of inputs; a second binary neuron, having a first input network with a second number of inputs, the second number being different from the first number; a plurality of multiplexers, each having an output connected to a respective input of the inputs of the first input network of the first binary neuron; and a plurality of flip-flops, each having an output connected to an input of a respective multiplexer of the plurality of multiplexers.

In some embodiments, the first input network of the first binary neuron is a left input network of the first binary neuron.

In some embodiments, the first binary neuron further includes a second input network, the second input network being a right input network of the first binary neuron.

In some embodiments, the second input network of the first binary neuron has the same number of inputs as the first input network of the first binary neuron.

In some embodiments, the first number is 6 and the second number is 5.

In some embodiments, the first neuron cluster includes 5 binary neurons, including the first binary neuron and the second binary neuron.

In some embodiments, a third binary neuron of the 5 binary neurons has a first input network with 4 inputs.

In some embodiments, a fourth binary neuron of the 5 binary neurons has a first input network with 3 inputs.

In some embodiments, a fifth binary neuron of the 5 binary neurons has a first input network with 3 inputs.

In some embodiments, the neuron processing element further includes a third neuron cluster and a fourth neuron cluster.

In some embodiments, the system includes a plurality of neuron processing elements including the neuron processing element.

In some embodiments, the system includes: a first image buffer; and a kernel buffer, the first image buffer being configured to feed image data to the neuron processing elements, and the kernel buffer being configured to feed kernel data to the neuron processing elements.

In some embodiments, the neuron processing elements are configured to perform quantized neural network inference operations based on the image data and the kernel data.

In some embodiments, the system includes a processing unit controller, the processing unit controller being connected to control inputs of the multiplexers.

In some embodiments, the system includes a second image buffer, connected to the first image buffer.

In some embodiments, the system includes a memory controller, configured to control the kernel buffer, the first image buffer, and the second image buffer.

In some embodiments, the first image buffer, the kernel buffer, the processing unit controller, and the neuron processing elements are on one integrated circuit chip.

According to an embodiment of the present disclosure, there is provided a method, including: mapping a plurality of operations corresponding to a neural network inference operation to: a plurality of resources, and a plurality of time steps, wherein each of the resources is a register of a neuron cluster.

In some embodiments, the mapping includes minimizing a cost function subject to a plurality of constraints, the cost function being a function of an execution time of the neural network inference operation.

In some embodiments, the minimizing includes using integer linear programming.

In some embodiments, the mapping satisfies one or more routing constraints.

BRIEF DESCRIPTION OF THE DRAWINGS

These and other features and advantages of the present disclosure will be appreciated and understood with reference to the specification, claims, and appended drawings wherein:

FIG. 4C is a table of notation used to describe an integer linear programming formulation, according to an embodiment of the present disclosure;

FIG. 5B is a table showing numbers of decision variables generated and times required, according to an embodiment of the present disclosure;

FIG. 8B is a table summarizing a complexity analysis, according to an embodiment of the present disclosure.

DETAILED DESCRIPTION

Figure 1A:
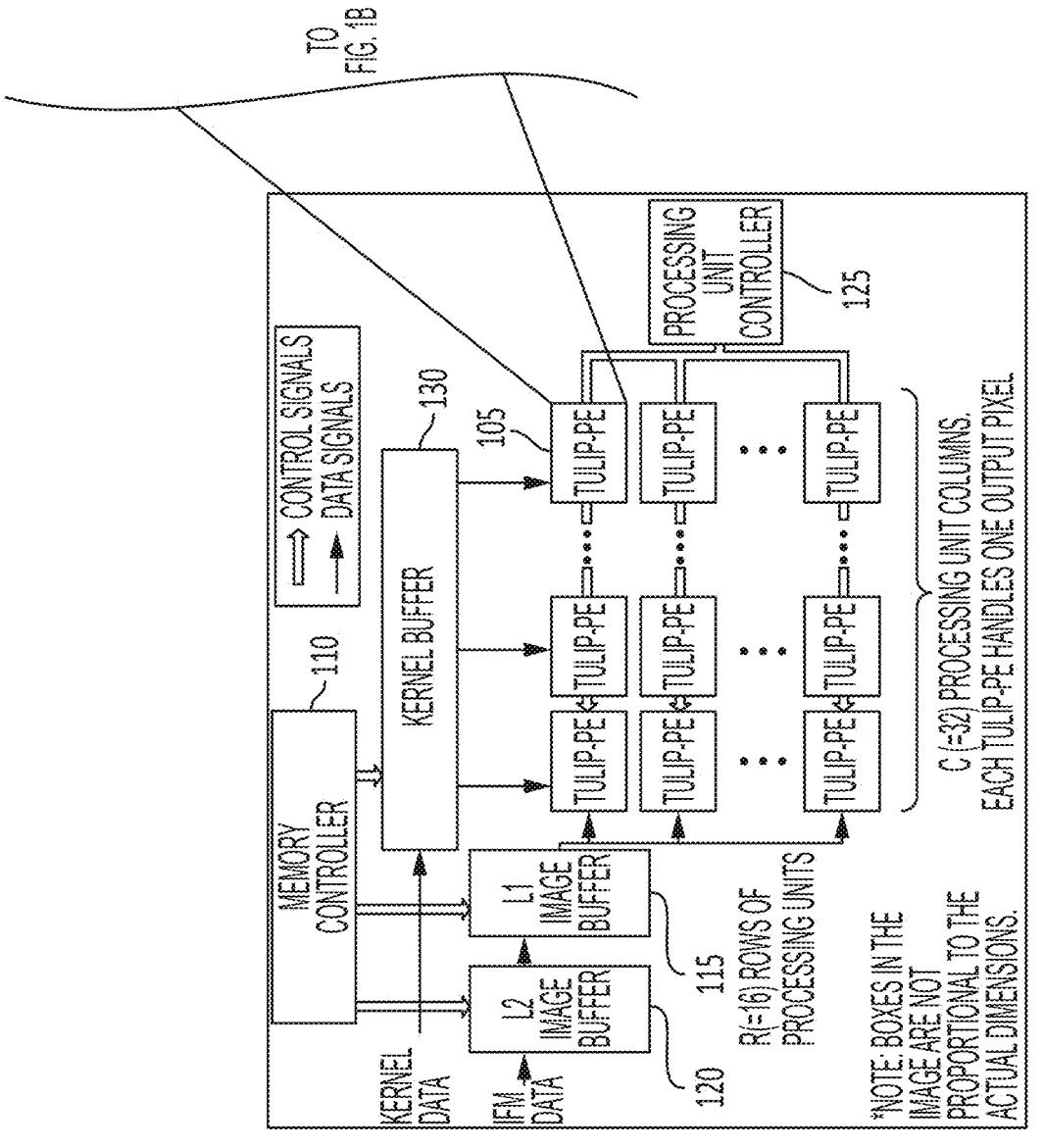
FIG. 1A is a top-level system diagram of a system for quantized neural network inference, according to an embodiment of the present disclosure.

The detailed description set forth below in connection with the appended drawings is intended as a description of exemplary embodiments of a quantized neural network circuit provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Some embodiments include a system for variable precision quantized neural network (QNN) inference (or simply "system for quantized neural network inference"). The system for variable precision quantized neural network inference may provide high energy efficiency per classification. The system for quantized neural network inference may be constructed by arranging a collection of neuron processing elements (or simply "processing elements") in a single instruction multiple data (SIMD) fashion. Each processing element contains binary neurons that are interconnected using multiplexers. Each neuron has a dedicated neuron local register connected to it. The binary neurons are implemented as standard cells and used for implementing threshold functions, e.g., an inner-product and thresholding operation on its binary inputs. Each neuron may be reconfigured with a single change in control signals received by the neuron (e.g., control signals used to control the multiplexers) to implement all the standard operations used in a QNN. Algorithms for implementing the operations of a QNN on the processing elements in the form of a schedule of threshold functions are disclosed herein. In some embodiments, the system for quantized neural network inference may be between 30 times and 50 times more energy-efficient than a functionally equivalent design based on multiplier accumulator circuits, without any penalty in performance, area, or accuracy. Furthermore, the system for quantized neural network inference may achieve these improvements without using techniques such as voltage scaling or approximate computing. Finally, this disclosure explains how the runtime trade-off between accuracy and energy efficiency may be done on the system for quantized neural network inference.

Deep neural networks (DNNs) have been remarkably successful in numerous applications, such as pattern recognition and data mining, including speech recognition, image classification, object recognition, autonomous vehicles and robotics, and recommendation systems. Consequently, they have become an important algorithmic framework in machine learning. DNNs are computationally and energetically intensive algorithms that may perform billions of floating point multiply-accumulate operations on very large dimensional datasets, some involving tens of billions of parameters. Because training of large networks entails much greater computational effort and storage than inference, it may be performed on high-performance servers with numerous central processing unit (CPU) cores and graphics processing unit (GPU) cores.

The energy cost and the environmental impact of training and inference of large DNNs are increasing. For instance, training of the GPT-3 model with 175 billion parameters using 1024 GPUs may consume 936 MWh of energy and take 34 days at a cost of $4.6 M. Models even larger than the GPT-3 are being developed.

Improvements in the energy efficiency of DNNs are not limited to high-performance servers or desktop machines. The latest "midrange" and "high-end" mobile systems on chips (SoCs) are being equipped with custom neural network (NN) hardware accelerators to perform inference on mobile devices (e.g., smartphones) and edge devices (e.g., internet of things devices deployed in numerous spaces) for many of the above applications. The energy efficiency of inference on battery-powered devices may also be of critical importance in terms of value to the customer and environmental impact. Given the rapid proliferation of machine learning (ML) techniques, it may be highly advantageous to obtain several orders of magnitude improvement in energy efficiency over CPU-GPU implementations for training and inference of DNNs.

Application-specific integrated circuits (ASICs) and field programmable gate arrays (FPGAs) are two alternates to CPU-GPU implementations. The energy efficiency and throughput of FPGA implementations of DNNs may be in between those of ASICs and CPU-GPUs.

Regardless of whether it may be an FPGA or ASIC implementation, throughput and energy efficiency may also be improved by modifying the structure of the NN. This includes tuning the hyper-parameters, modifying the network structure by removing some of the weights and connections, or by altering the degree of quantization. Another category of methods focuses on reducing the energy expenditure for moving data between the processor and off-chip memory, which may be especially acute in NNs because of the large number of weights involved. Techniques to mitigate this include maximizing the reuse of data fetched from memory, or transferring compressed data from the memory to the processor.

Quantization may be an effective way to achieve high energy efficiency and reduce computation time, especially for energy-constrained systems. Quantization refers to using smaller bit-widths for the weights and/or the inputs during training, reducing them from 32-bit values to anywhere from 8-bit to 1-bit values. The term binary neural network (BNN) refers to neural networks with 1-bit weights and inputs. A neural network using higher than 1-bit precision, but less than full 32-bit precision may be referred to as a QNN. Quantization takes advantage of the fact that the accuracy of NNs may be not very sensitive to substantial reductions in bit-widths provided the bit width remains below a certain critical value. Depending on the network, 4-bit to 1-bit QNNs for mobile applications may provide a good tradeoff between energy efficiency and throughput versus accuracy.

This disclosure presents the design of a system (which may be implemented in an ASIC) for quantized neural network inference for accelerating QNNs. The system for quantized neural network inference may achieve substantial improvements in energy efficiency compared to the state-of-the-art design of QNNs. Energy efficiency may be defined as throughput-per-watt, or equivalently, operations-per-joule.

Figures 1B, 1C:
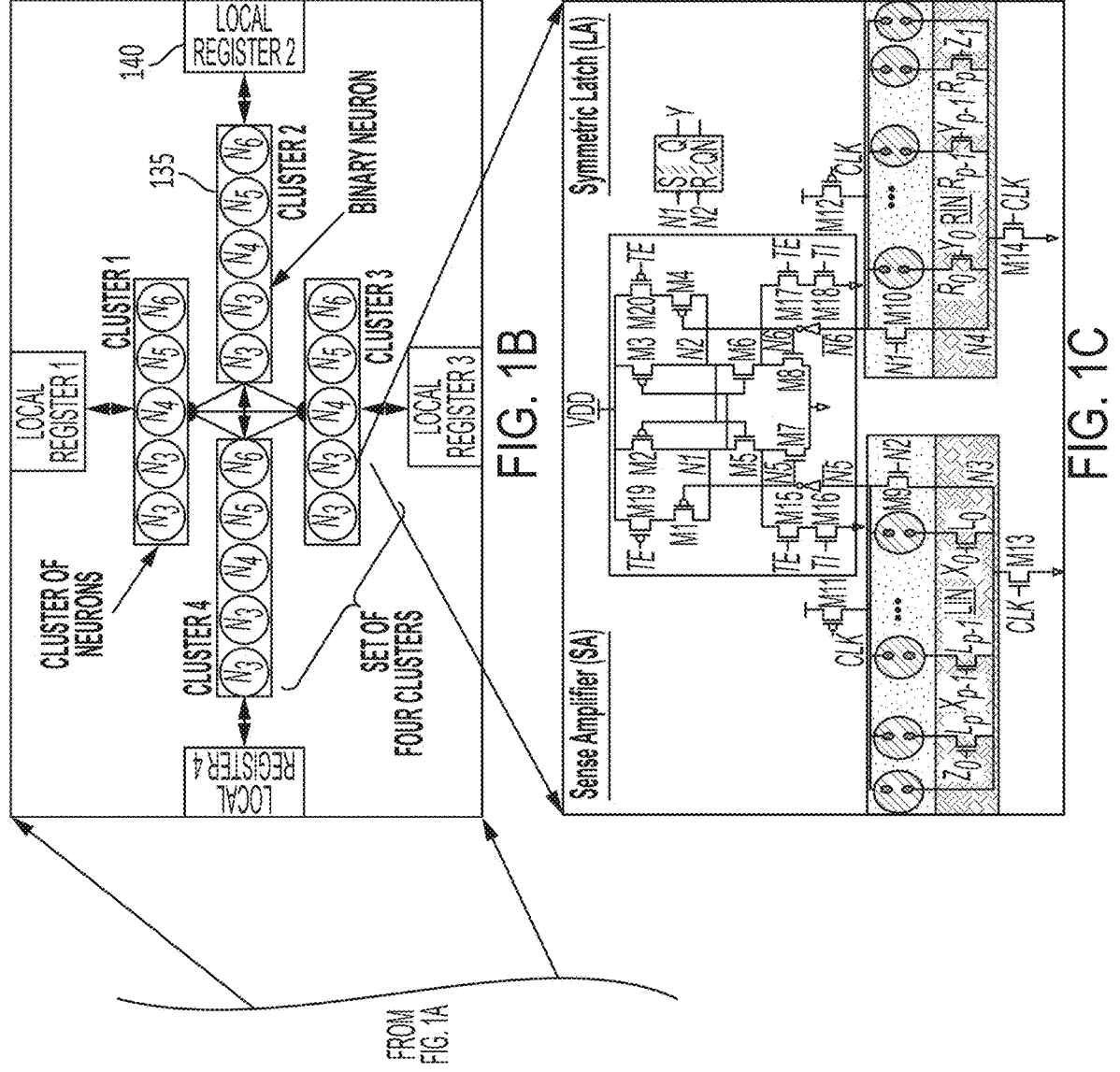
FIG. 1B is a block diagram of a processing element, according to an embodiment of the present disclosure.
FIG. 1C shows the circuit structure of a binary neuron, according to an embodiment of the present disclosure.

FIGS. 1A-1C show the main components of a system for quantized neural network inference, in some embodiments. The following is a summary of these components, which is elaborated upon below. FIG. 1A shows the top-level system diagram of the system for quantized neural network inference. It may be a scalable single instruction multiple data (SIMD) machine that includes (e.g., consists of) a collection of independent, concurrently executing processing elements 105 (or "neuron processing elements", each labeled "TULIP PE" in FIG. 1A). The memory controller 110, the L1 image buffer 115, and the L2 image buffer 120 may be employed store, and provide inputs to the grid of processing elements 105 (TULIP PEs) present in the architecture. In operation, the processing unit controller 125 may configure the processing elements. Input pixels and weights may be sent through the image buffers 115, 120 and a kernel buffer 130. The output of the processing elements 105 may be collected in output buffers before being sent back to the memory.

The internal structure of one of the processing elements 105 is shown in FIG. 1B. The processing element 105 (or "neuron processing element") includes (e.g., consists of) four clusters 135 of binary neurons and four cluster local registers 140, each comprising a plurality of register bits (e.g., flip-flops). The circuit structure of a binary neuron, in some embodiments, is shown in FIG. 1C, and described in greater detail below. Each input of each binary neuron may be connected to an output of a respective multiplexer, which may select an input value to be fed to the binary neuron from a plurality of available outputs, e.g., one or more of the register bits, and one or more outputs of other binary neurons in the cluster 135 or in other clusters 135. Each binary neuron may have a respective number of inputs K, in the left input network (LIN), and in the right input network (RIN), as shown in FIG. 1C. In operation, each binary input of the LIN and each binary input of the RIN may be multiplied by a respective neuron weight (which may be implemented as a programmable resistance, e.g., a floating-gate transistor) and the products formed in the LIN and in the RIN may be summed at respective inputs of a sense amplifier (e.g., the currents flowing through the programmable resistances in the LIN and in the RIN may be summed at respective summing nodes, each of the two summing nodes being an input of the sense amplifier). The sense amplifier may then generate a binary output the value of which depends on whether the sum of the products in the LIN is greater or less than the sum of the products in the RIN. As such, the binary neuron may be a mixed-signal circuit which has binary inputs and a binary output, and which performs analog multiplications (by the neuron weights) internally. In some embodiments the number of inputs of the RIN is different from the number of inputs of the LIN.

The binary neurons in each cluster 135 may have different numbers of inputs, shown as a subscript in FIG. 1B; for example, each cluster 135 in FIG. 1B includes five binary neurons, for each of which the number of inputs of the RIN is the same as the number of inputs of the LIN. Each cluster 135 in FIG. 1B includes two binary neurons with 3 pairs of inputs each one binary neuron with 4 pairs of inputs, one binary neuron with 5 pairs of inputs, and one binary neuron with 6 pairs of inputs (each pair of inputs including an input to the LIN and an input to the RIN). In some embodiments, each neuron in FIG. 1B (i) is connected to the corresponding neuron in each of the other clusters 135 and (ii) is not connected to any other neuron in the same cluster 135. Each binary neuron is part of a circuit element illustrated in FIG. 1D, which may be referred to as a configurable processing circuit 405, and which includes the binary neuron 305, a neuron local register 410 (which may be a 16-bit register; the 1-bit output of the binary neuron 305 may be written to a selected bit of the neuron local register 410, the selected bit being determined by an address contained in control signals generated by the processing unit controller 125), and a plurality of multiplexers 415, each of the multiplexers 415 having (i) a plurality of data inputs and (ii) an output connected to a respective input of the binary neuron 305. The neuron local register 410 of each of the configurable processing circuits 405 may be a subset of the bits of the cluster local register 140 of the cluster to which the configurable processing circuit 405 belongs. Each binary neuron may be connected to, and may communicate with, the corresponding binary neurons in the other clusters 135 using the multiplexers 415.

As used herein, a "binary neuron" is a clocked logic cell that computes a threshold function of its inputs, on a clock edge. It may be a mixed-signal circuit, whose inputs and outputs are logic signals but internally it computes the inner-product and threshold operation of a neuron, i.e., $$f(x_1, \ldots, x_n \mid w_1, \ldots, w_n, T) = \Sigma_i^n w_i x_i \geq T.$$

Implemented as a standard cell, and after optimizing for robustness and accounting for process variations, a neuron in 40 nm may be slightly larger than a conventional D-type flip-flop. The neurons in a processing element 105 can be configured at run time to execute all the operations of a QNN, namely the accumulation of partial sums, comparison, max-pooling, and ReLU. Consequently, only a single processing element 105 may be required to implement all the operations in a QNN, and switching between operations may be accomplished by supplying an appropriate set of logic signals to its inputs, which incurs no extra overhead in terms of area, power, or delay.

Unlike some alternate circuits (e.g., multiplier accumulators or fixed-size accumulator-based processing elements), that are designed to operate at maximum bit-width (determined at design-time), the bit precision of processing elements 105 can be changed within a single cycle without incurring a delay or energy penalty. The processing elements 105 enable control over the precision of both inputs (weights and activations) and output. The operation of the processing elements 105 prevents over-provisioning of the hardware for an operation of a certain bitwidth, thus improving the energy efficiency of the overall computation. This characteristic allows for making trade-offs between energy efficiency and accuracy at run-time.

Compared to state-of-the-art MAC units used in QNN accelerators, the processing element 105 may be 16 times smaller and may consume 125 times less power. Although it may be 9.6 times slower, this can be compensated by replicating 16 PEs and operating the system for quantized neural network inference in a SIMD mode, executing multiple workloads in parallel that share inputs, which reduces the need to repeatedly fetch data from off-chip memory.

Since the neurons in the processing element 105 have limited fan-in, much larger inner product calculations may first be decomposed into smaller bit-width operations and then scheduled on the processing elements. For this, a routing-aware, resource-constrained, scheduling algorithm is disclosed that maps the nodes of a QNN onto processing elements.

The combined effect of the low area of each processing element 105, the uniform computation at the individual node and network levels, and the mapping algorithm results in an improvement of up to 50 times in energy efficiency for QNNs over a MAC-based design for the same area and performance.

A Boolean function $f(x_1, x_2, \ldots, x_n)$ may be called a threshold function if there exist weights $w_i$ for $i=1, 2, \ldots n$ and a threshold T such that $$f(x'_1, x'_2, \ldots x_n) = 1 \Leftrightarrow \Sigma_{i=1}^n w_i x_i \geq T \qquad (1)$$

Where $\Sigma$ denotes the arithmetic sum. Without loss of generality, the weights and the threshold may be integers.

A threshold function may be denoted by the pair (W, T)=$[w_1, w_2, \ldots, w_n; T]$. An example of a threshold function is $f(x_1, x_2, x_3, x_4)=x_1x_2 \vee x_1x_3 \vee x_1x_4 \vee x_2x_3x_4$ with $[w_1, w_2, w_3, w_4; T]=[2,1,1,1; 3]$.

As used herein, a "binary neuron" is a circuit that realizes a threshold function defined by Equation (1). FIG. 1C shows the design of a binary neuron that may be used in the system for quantized neural network inference. The binary neuron shown in FIG. 1C has four main components: the left input network (LIN), the right input network (RIN), a sense amplifier (SA), and an output latch (LA) (the output latch being (i) illustrated, in FIG. 1C, to the right of the sense amplifier, and (ii) connected to the outputs N1 and N2 of the sense amplifier). The sense amplifier outputs are differential digital signals (N1, N2), with (1, 0) and (0, 1) setting and resetting the latch. The LIN and RIN consist of a set of branches, each branch consisting of two devices in series, one (illustrated as a circle containing two dots) which provides a configurable conductance between its two terminals, and a MOSFET driven by an input signal $x_i$. The conductance of a branch controlled by x; serves as a proxy for the weight $w_i$ in Equation 1. If $G_L(X|W)$ and $G_R(X|W)$ are used to denote the conductance of the LIN and RIN, respectively, then for a given threshold function $f$, the conductance of each branch may be configured so $G_L(X|W)>G_R(X|W)$ for all on-set minterms of $f$, and vice versa for all off-set minterms of $f$.

When CLK=0, the LIN and RIN play no role, (N1, N2)=(1, 1), and the output Y of the latch remains unchanged. Before the clock rises, inputs are applied to the LIN and RIN. If an on-set minterm is applied, then when CLK0→1, both N1 and N2 will start to discharge. However, since $G_L(X|W)>G_R(X|W)$, N1 will discharge faster than N2, which will also turn off the discharge of N2, resulting in N2 going back to 1. The result is (N1, N2)=(0, 1), which will set the latch output Y=1. Thus the binary neuron in FIG. 1C may be viewed as a multi-input, edge-triggered flip-flop that computes a threshold function of its inputs on a clock edge.

The processing element 105 may be designed to implement the nodes of all the layers in a QNN. This may be achieved by decomposing the node's operations (multiplication, ReLU, etc.) into K-bit primitive operations. These are addition, comparison, or logic operations that are executed in at most two cycles. They are realized as threshold functions and computed by artificial neurons. N-bit (N>K) operations are executed as a sequence of K-bit operations.

The following notation may be used to describe single and multi-bit values.

Characters (e.g., A) without dimensions specified denote variables that may either be a single-bit or a multi-bit value.

Square brackets (eg. $A_{[0]}$, $A_{[K-1:0]}$, etc.) are used to represent bit vectors.

Characters having subscripts but no square brackets (e.g., $A_0$) denote single-bit variables.

Bit replication is denoted with the variable enclosed in curly braces with the multiplier in the subscript. For instance, $\{A_{[0]}\}_{\times N}$ represents a N-bit vector with all bits equal to $A_{[0]}$.

Equation 2 shows a unified notation for the threshold functions used to describe the primitive operations. In the expression, p is an integer, X and Y are p-bit operands and $Z_0$ and $Z_1$ are 1-bit values.

$$Q(p, X, Y, Z_0, Z_1) = Z_0 + \sum_{j=0}^{p-1} 2^j X_j \geq Z_1 + \sum_{j=0}^{p-1} 2^j Y_j \qquad (2)$$

In Equation 2, the right hand side of the equation is equal to one when the inequality of the right hand side of the equation is true, and equal to zero otherwise. Primitive operations may be expressed in terms of Q.

1) Logic operations: Primitive logic functions AND, OR, and NOT, are threshold functions. The corresponding logic operations on K-input operands A and B are denoted as LK(A, B) (binary) or LK(A) (unary). They are realized as a vector of K threshold functions on each corresponding bit. That is, $$\text{AND } (A_{[K-1:0]}, B_{[K-1:0]}) = [Q(1, A_{[K-1]}, \bar{B}, 0, 1), \ldots, \qquad (3)$$

$$Q(1, A_{[0]}, \bar{B}, 0, 1)]$$

As an example, consider a 2-bit AND operation between two 1-bit operands A and B, which can be calculated using $Q(1, 0, A, 1, \bar{B})$. Substituting appropriate values in Equation 2 results in $0+A\geq1+\bar{B}$, which in turn can be rewritten as $A+\bar{B}\geq2$.

Other K-bit logic operations may be similarly defined. Some such operations may be computed in one cycle by a neuron cluster 135 in a neuron processing element 105. On the other hand, $XOR(A_{[i]}, B_{[i]})$ may be realized as a two-level threshold network and therefore may use two cycles. In terms of Q, it is derived as follows: an XOR operation is represented as a pseudo-Boolean equation $A_{[i]}+B_{[i]}-2A_{[i]}B_{[i]}$. This can be written in the form of an inequality $A_{[i]}+B_{[i]}-2A_{[i]}B_{[i]}\geq1$, which in-turn can be written as $A_{[i]}+B_{[i]}>1+2A_{[i]}B_{[i]}$. Consequently, the representation in Equation 2, with substitution for the term AB from Equation 3, may be used to arrive at the following equation:

$$XOR\!\left(A'_{[i]}B_{[i]}\right) = Q\!\left(2,\, A_{[i]},\, Q\!\left(1,\, A_{[i]},\, \overline{B},\, 0,\, 1\right),\, B_{[i]},\, 1\right) \quad (4)$$

For example, an XOR operation between two 1-bit operands A and B may be rewritten using a combination of Equation 4 and Equation 2 as A+B−2AB≥1.

Figure 2:
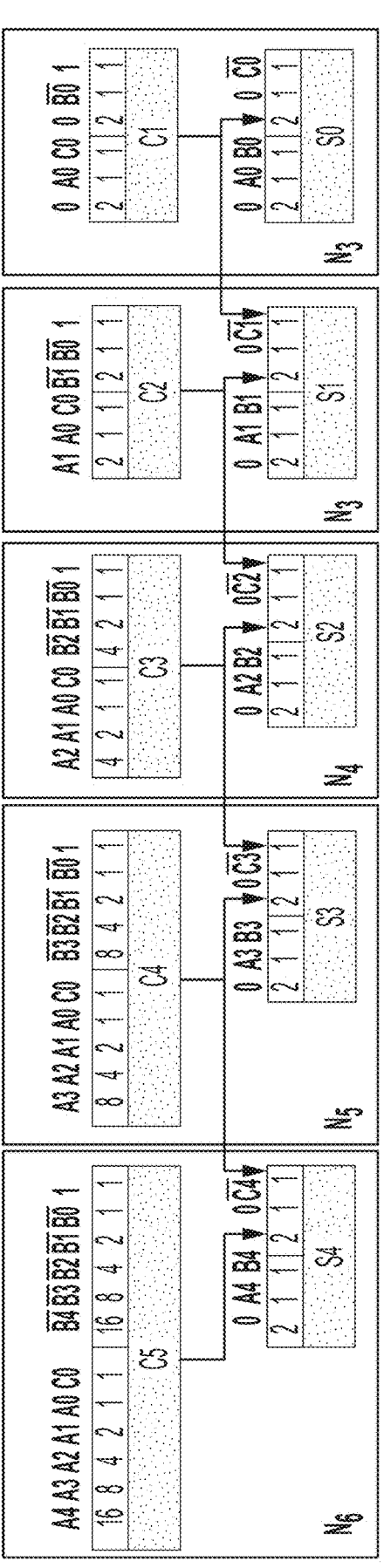
FIG. 2 is an illustration of a 5-bit carry lookahead adder using binary neurons, according to an embodiment of the present disclosure.
Figures 3A, 3B, 3C, 3D, 3E:
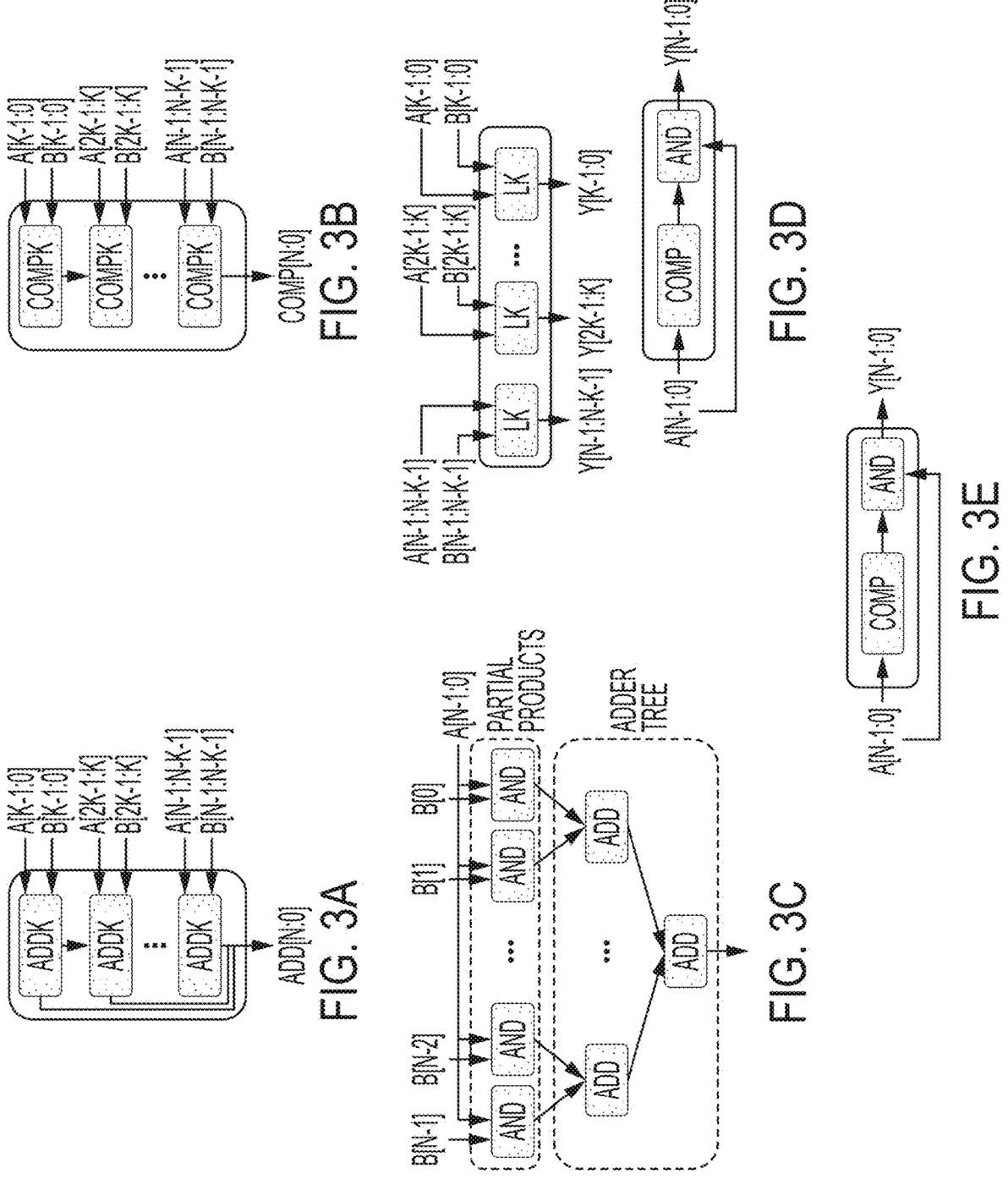
FIGS. 3A-3E are illustrations of primitive operations that may be performed by a network of neurons, according to an embodiment of the present disclosure.

2) Addition (ADDK(A, B, $C_0$)): Let $C_{i+1}$ denote the carryout of stage i, i≥0. A carry lookahead of size i means that $C_i$ may be expressed as a function of $A_{[i-1:0]}$, $B_{[i-1:0]}$ and $C_0$. While the carryout function is a threshold function regardless of the size of the lookahead, the sum function $S_i$ is a threshold function of carry-out $C_{i+1}$ and carry-in $C_i$, as shown in FIG. 2. FIG. 2 shows a 5-bit carry lookahead adder using binary neurons that adds two 5-bit numbers A and B, and a 1-bit carry-in $C_0$. Each box represents Equation 2, such that the left sub-box and right sub-box represent the left and right-hand side of the equation respectively. Hence a K-bit addition, denoted by ADDK, takes two cycles.

In some embodiments, the number of active neurons and the number of cycles may both be changed (with a given calculation using more cycles if fewer active neurons are used).

$C_{i+1}$ and $S_i$ are expressed as $$C_{i+1} = Q(i+1,\, A_{[i:0]},\, B_{[i:0]},\, C_{0,1}) \quad 0 \le i \le K-1 \quad (5)$$

$$S_i = Q\!\left(2,\, \{C_{i+1},\, A_{[i]}\},\, \{0,\, \overline{B}\},\, 0,\, C_i\right) \quad (6)$$

This may be illustrated by considering an addition operation involving three 1-bit operands A, B, and $C_0$. This operation can be computed using Equations 5 and 6. When the appropriate values are substituted into Equation 2, the following may be obtained:

The carry bit $C_1$ can be expressed as $C_0 + A \ge 1 + \overline{B}$. This can be further rewritten as $A + B + C_0 \ge 2$.

The sum bit $S_0$ can be represented as $A + B \ge 2C_1 + \overline{C_0}$. This, in turn, can be rewritten as $A + B + \overline{C_0} - 2C_1 \ge 1$.

3) Comparison COMPK ($A_{[K-1:0]}$, $B_{[K-1:0]}$,C):

This computes the predicate $Y = (A_{[K-1:0]} + C > B_{[K-1:0]})$. In terms of Q, it is represented by $$Y = Q(K,\, A_{[K-1:0]}\overline{B_{[K-1:0]}}C,\, 1) \quad (7)$$

For N-bit operands (N>K), addition, comparison, logic, multiplication, and ReLU operations (among other operations) can be realized using K-bit primitive operations. Examples are shown in FIGS. 3A-3E. These primitive operations can be executed sequentially on a processing element.

The hardware architecture of a processing element 105 may be constructed as follows. A processing element 105 (FIG. 1B) contains four clusters 135, each cluster 135 containing K neurons. The neurons in each cluster 135 are labeled $N_K$, where K is the fan-in of the neuron in a cluster 135 (indexed left to right). The $i^{th}$ significant bit (i∈ [1, K]) of a primitive operation may be computed by the $i^{th}$ neuron of a cluster. Therefore, the fan-in needed for a cluster's $i^{th}$ neuron may be determined by the maximum number of inputs needed to represent the threshold function corresponding to the $i^{th}$ bit of every primitive operation.

Figure 1D:
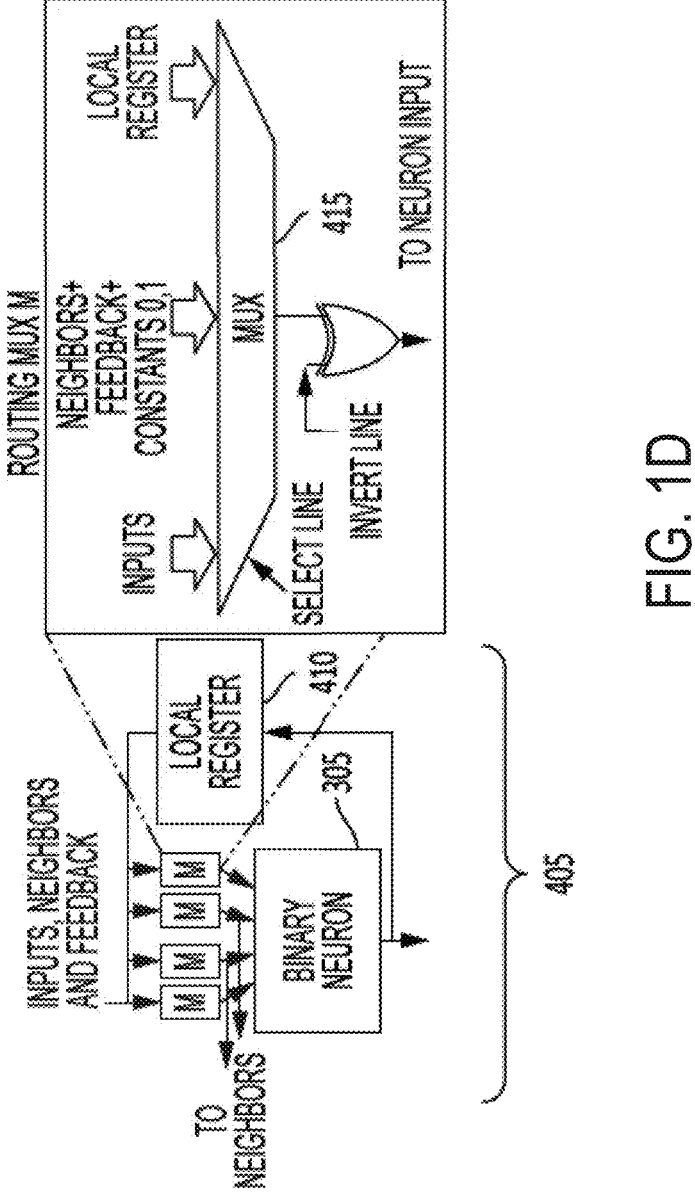
FIG. 1D is a block diagram of a configurable processing circuit, according to an embodiment of the present disclosure.

As shown in FIGS. 1B and 1D, multiplexers are used to connect each neuron to its external inputs, to its neighboring neurons (e.g., to the corresponding neuron in each of the other clusters 135), to its neuron local register 410 (designed using latches), and to its own output (feedback). In some embodiments of the processing element 105, the weights associated with the neurons are chosen so as to allow the implementation of all the primitive operations by simply applying the appropriate signals to each neuron's inputs, and also to ensure that neuron $N_i$ can realize all the functions realizable by $\mathcal{N}_j$, j<i.

The processing element 105 may include a minimum of four clusters 135 to ensure a single cycle delay between the launch of any two consecutive primitive operations. Considering that each primitive operation can be represented as a two-level (or one-level) computation of threshold functions, only two clusters 135 are sufficient to perform the computation at any given time (compute mode), while the remaining two clusters 135 may be employed to read operands from their respective cluster local registers 140 and share them with the first two clusters 135 (routing mode). The clusters 135 switch between the compute and routing modes depending on the cluster local registers 140 in which the operands are stored and the cluster local register 140 to which the output is to be written.

The number of bits that can be processed in each cycle increases with the number of neurons K in each cluster. The larger the K, the better the performance. However, as K increases, the maximum fan-in of the binary neurons in each cluster 135 also increases. Since there may be a maximum fan-in limitation of the binary neuron, in the present implementation of processing element 105, K=5.

A QNN node may be realized on a processing element 105 as follows. A QNN may be represented as a directed acyclic graph (DAG), where each node either represents an inner product that involves a sum of multi-bit products, or a non-linear activation function (e.g., a ReLU). The multi-bit products are computed using multi-bit logic and addition operations (see FIGS. 3A-3E), which are primitive operations that are performed by a network of neurons. Thus, at the lowest level of granularity, a QNN node may be a network of threshold functions that may be scheduled on the neurons (the compute elements) in the processing element 105 with the objective of minimizing the completion time, subject to the registers and the routing constraints.

The threshold graph scheduling (TGS) problem may be the same as the problem of mapping a dataflow graph (DFG) of computations onto a Course Grain Reconfigurable Array (CGRA). A precise formulation of the CGRA scheduling problem may be shown to be NP-complete. Appendix A of the appendix attached hereto includes a precise formulation of TGS, which is the problem of scheduling a compute graph of threshold functions onto a specific network of neurons that constitute a processing element 105.

Since existing approaches to solve the above problem have exponential time complexity with respect to the number of nodes in the compute and resource graphs, they may not scale well. In the following, an alternate approach is disclosed that may be efficient and scalable. This may be done by increasing the granularity of the nodes in the compute and resource graphs, which results in a significant reduction in their sizes. The nodes in the compute graph are now primitive operations and the compute units are now clusters. The mapping problem may be further simplified because a new operation can be initiated on a cluster on every cycle, i.e., its initiation interval may be one. The register-aware, minimum latency schedule of the primitive graph on the clusters is first computed and then the neurons on each cluster are configured to compute the function of the assigned primitive node of each cluster 135.

Figures 4A, 4B:
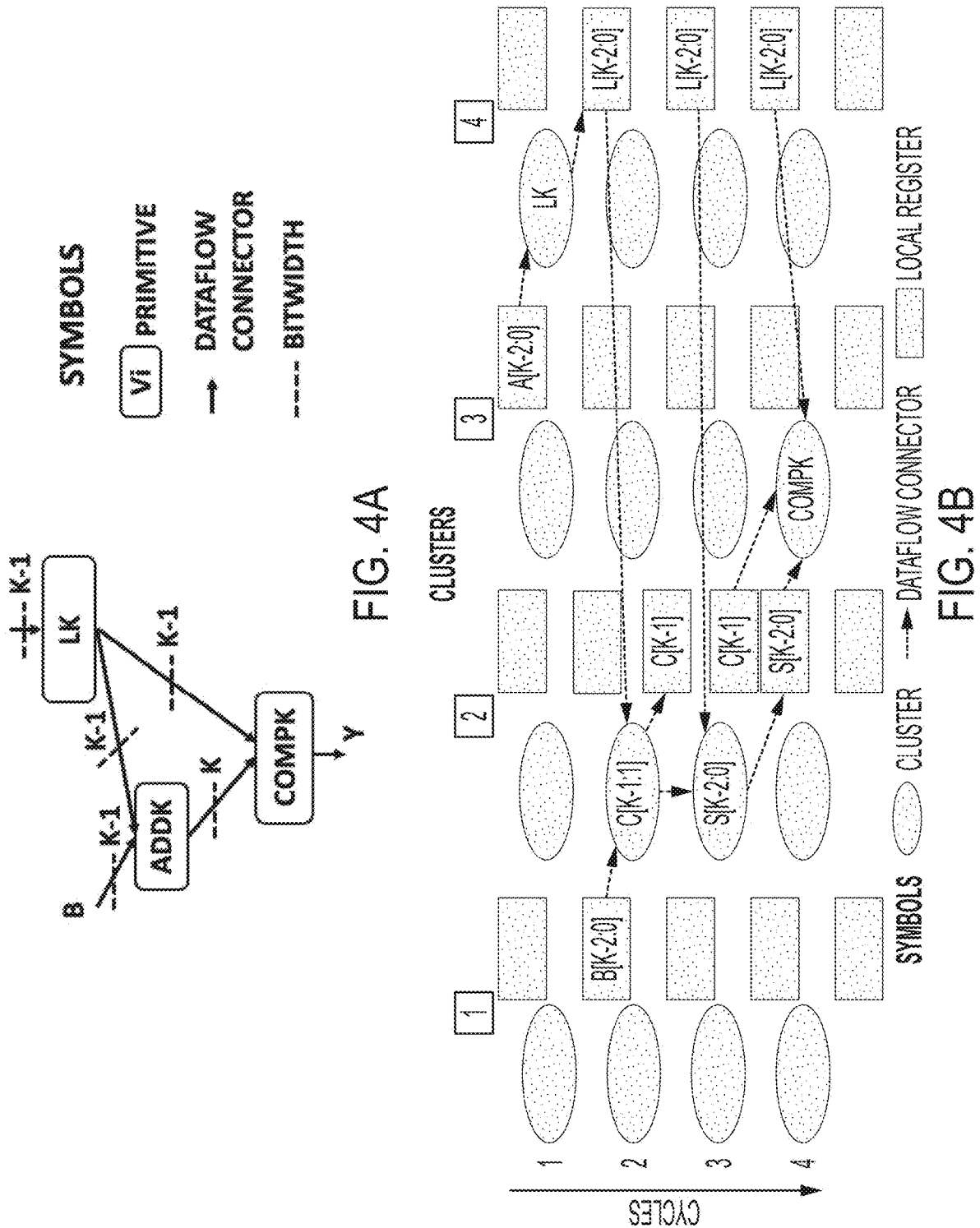
FIG. 4A is an illustration of a compute graph, according to an embodiment of the present disclosure.
FIG. 4B is an illustration of a sequence of compute cycles, according to an embodiment of the present disclosure.

This is illustrated in FIGS. 4A and 4B, which shows a feasible mapping of a primitive graph to a resource graph. FIGS. 4A and 4B show the mapping of a primitive graph $G_P$ to a resource graph, where each resource is either a cluster or cluster local register 140. The compute graph in FIG. 4A contains three primitive operations LK, ADDK, and COMPK, which are initialized in consecutive cycles as shown in FIG. 4B. Operands A and B are stored in local registers 3 and 1 (each of which is a cluster local register 140). The operation LK is executed in cluster 4 and stored in its cluster local register (local register 4). The sum and carry bits of the ADDK operation are calculated in cluster 2 using the data stored in local registers 1 and 4 (each of which is a cluster local register 140) and the result is stored in local register 2 (which is a cluster local register 140). Finally, the data from local registers 2 and 4 are used to compute COMPK to generate the final output Y.

A primitive graph may be scheduled on a processing element 105 as follows. First, a primitive graph $G_P(V_P, E_P)$ may be defined (in a definition that may be referred to herein as Definition 5.1) to be a directed acyclic graph where each node $v \in V_P$ represents a K-input primitive operation, i.e., K-bit addition, comparison, or logic. Each edge (represented by the symbol e, used without a subscript; e used with a subscript has a different meaning, specified below), $e \in E_P$, represents a data dependency between the primitive operations.

An ILP (integer linear programming) formulation is disclosed, in the following, for the problem of scheduling a primitive graph that represents a single QNN node, on a processing element. Table I (the table of FIG. 4C) shows the notation used to describe the ILP formulation.

The primitive scheduling problem may establish bindings between operations v, time steps t, and resources (cluster local registers 140) r, since clusters store outputs in their respective cluster local registers 140. Such bindings are represented using triple-indexed binary decision variables $\chi_{v,r,t}$ shown in Equation 8.

$$\chi_{v,r,t} = \begin{cases} 1 & \text{if } v \text{ is mapped to } r \text{ at time } t \\ 0 & \text{otherwise} \end{cases} \quad (8)$$

Using the above equation, two additional binding variables are derived: $\rho_{v,r}$, which represents the mapping of v with local register r (which is a cluster local register 140), and $\tau_{v,t}$ which represents the mapping of v with time t. These variables are used to express resource and time-specific constraints respectively.

$$\rho_{v,r} = \bigvee_{t=0}^{t=T-1} \chi_{v,r,t} \quad (9)$$

$$\tau_{v,t} = \bigvee_{r=0}^{r=3} \chi_{v,r,t} \quad (10)$$

There are L cluster local registers 140, each of size B bits. The minimum time required to execute all the primitives on $G_R$ may be $T=2|V_P|$. With the goal of minimizing the makespan E (execution time) of $G_P$ on a processing element, the following constraints (subject to which E may be minimized) may be used to define the set of feasible solutions.

$$\text{Minimize } E \text{ such that} \quad (11)$$

1. Resource availability constraints: These constraints are added to ensure that the cluster local registers 140 are not over-utilized. The first constraint (Equation 12) ensures that the storage used by a local register r at any time t does not exceed the maximum capacity B.

$$\sum_{\forall v \in V_P} b_v \cdot \chi_{v,r,t} \leq B, \forall r \in [0, 3], \forall t \in [0, T-1] \quad (12)$$

The second constraint (Equation 13) ensures that each primitive's output is stored in only one cluster local register 140.

$$\sum_{\forall r \in J} \rho_{v,r} = 1, \forall v \in V_P \quad (13)$$

2. Precedence constraints: The constraint in Equation 14 may be added to ensure that the data dependency due to the precedence relationship between any two primitives u and v is satisfied in the schedule, where $s_k$ is the start time of operation k and $e_k$ is the end time of operation k.

$$s_u + d_u \leq s_v \leq e_u + 1, \forall u, v \in V_P, u \prec v \quad (14)$$

Figure 5A:
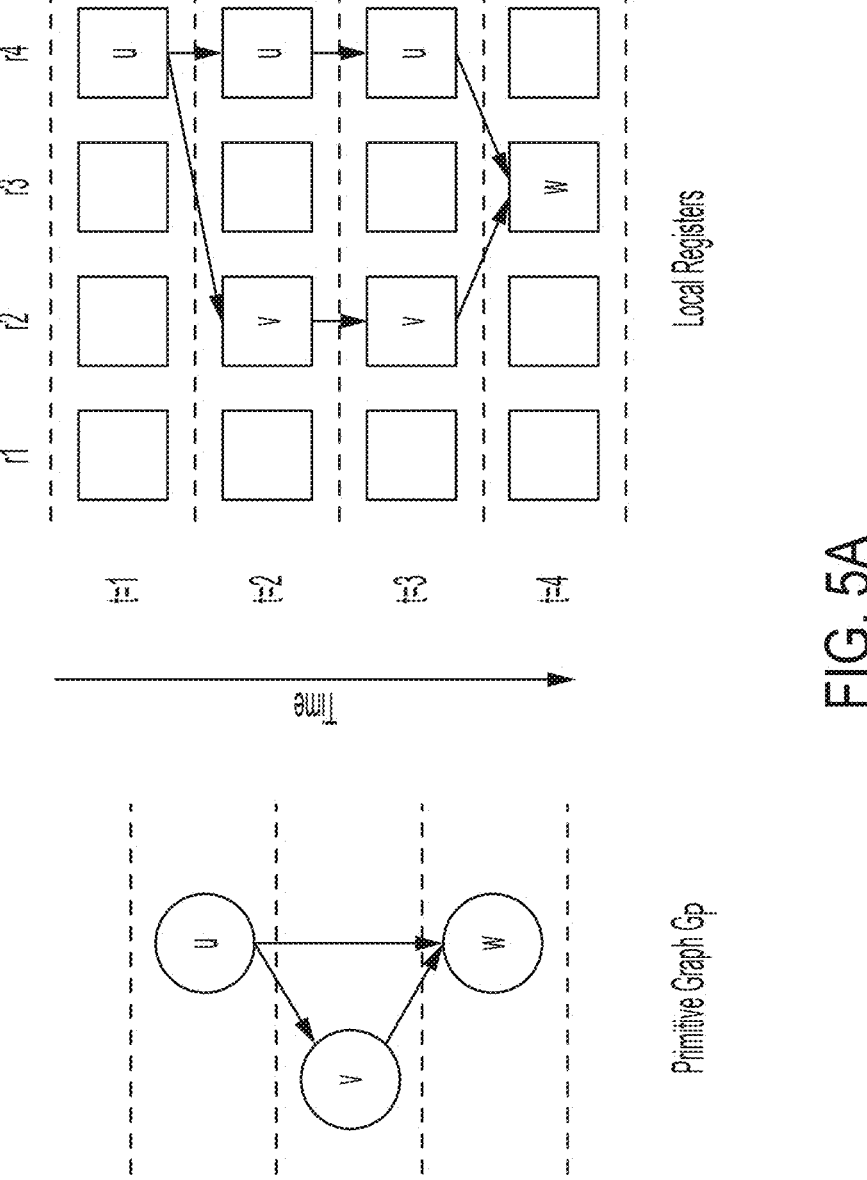
FIG. 5A shows an example to illustrate routing constraints in a primitive scheduling problem, according to an embodiment of the present disclosure.

FIG. 5A shows an example to illustrate routing constraints in the primitive scheduling problem. The output of each node in the primitive graph $G_P$ may be stored in the cluster local registers 140 of the processing element. For the schedule in FIG. 5A, $s_u=1$, $e_u=3$, $d_u=1$, $s_v=2$.

3. Timing validity constraints: These constraints ensure that the start and end times of all the nodes are valid and feasible (Equation 15), that the start times of any two nodes are not equal (Equation 16), and that $\tau_{v,t}$ is 1 while v is being performed and 0 at other times (Equation 17).

$$0 \leq s_v \leq e_v \leq T-1, \forall v \in V_P \quad (15)$$

$$s_u = 6s_v \forall u, v \in V_P, u \neq v. \quad (16)$$

$$\tau_{v,t} = \begin{cases} 1 & s_v \leq t \leq e_v \\ 0 & \text{otherwise} \end{cases} \quad (17)$$

The constraint in Equation 18 is added to identify the end time of the last primitive that will be scheduled on the processing element, so that it can be minimized in the objective function.

$$\forall v \in V_P, e_v \leq E \quad (18)$$

4. Routing constraints: The following constraints ensure that the data-routing capabilities of cluster local registers 140 are not violated; these constraints are explained as follows. A cluster local register 140 can perform either a read or a write operation at any given time, but not both simultaneously. Therefore, two nodes that share an edge cannot be assigned to the same cluster local register 140. In FIG. 5A, since u is the immediate predecessor of v, the output of u is stored in a different cluster local register than v. While the output of u is read from a cluster local register 140, the output of v is simultaneously written to a different cluster local register 140 (Equation 19). Furthermore, two sibling nodes cannot be assigned the same cluster local register 140. As shown in FIG. 5A, u and v are immediate predecessors of w. Therefore, u and v cannot have the same cluster local register 140. This constraint is used because the cluster local registers 140 supply only one operand to each primitive in the processing element. As a result, two separate cluster local registers 140 may be used to provide two operands (Equation 20).

$$\forall\, u, v \in V_P, \forall\, r \in [0, 3]u \prec v: \qquad (19)$$

$$\rho_{u,'r} + \rho_{v,'r} \le 1,$$

$$\rho_{u,r} + \rho_{v,'r} + \rho_{w,'r} \le 1. \qquad (20)$$

The mapping of the primitive operations to the clusters 135 of the processing element 105 may be determined by analyzing the decision variables $\rho_{v,r}$ and $s_v$. A node v may be executed on the cluster associated with the local register r if $\rho_{v,r}=1$, at the time specified by $s_v$. The stored data of v may then be maintained in the cluster local register 140 until time instance $e_v$.

Table II (the table of FIG. 5B) shows the number of decision variables generated and the time required when using the ILP to generate the schedule of compute graphs of neurons that compute $$\sum\nolimits_{i=0}^{N-1} w_i x_i$$

for a varying number of inputs (N). This may be a one-time cost to obtain the schedule for QNN nodes on a processing element. The size of the largest neuron may be N=4096. The ILP described above enables the processing element 105 to modify its schedule depending on the number of neurons enabled in each cluster.

Figure 6A:
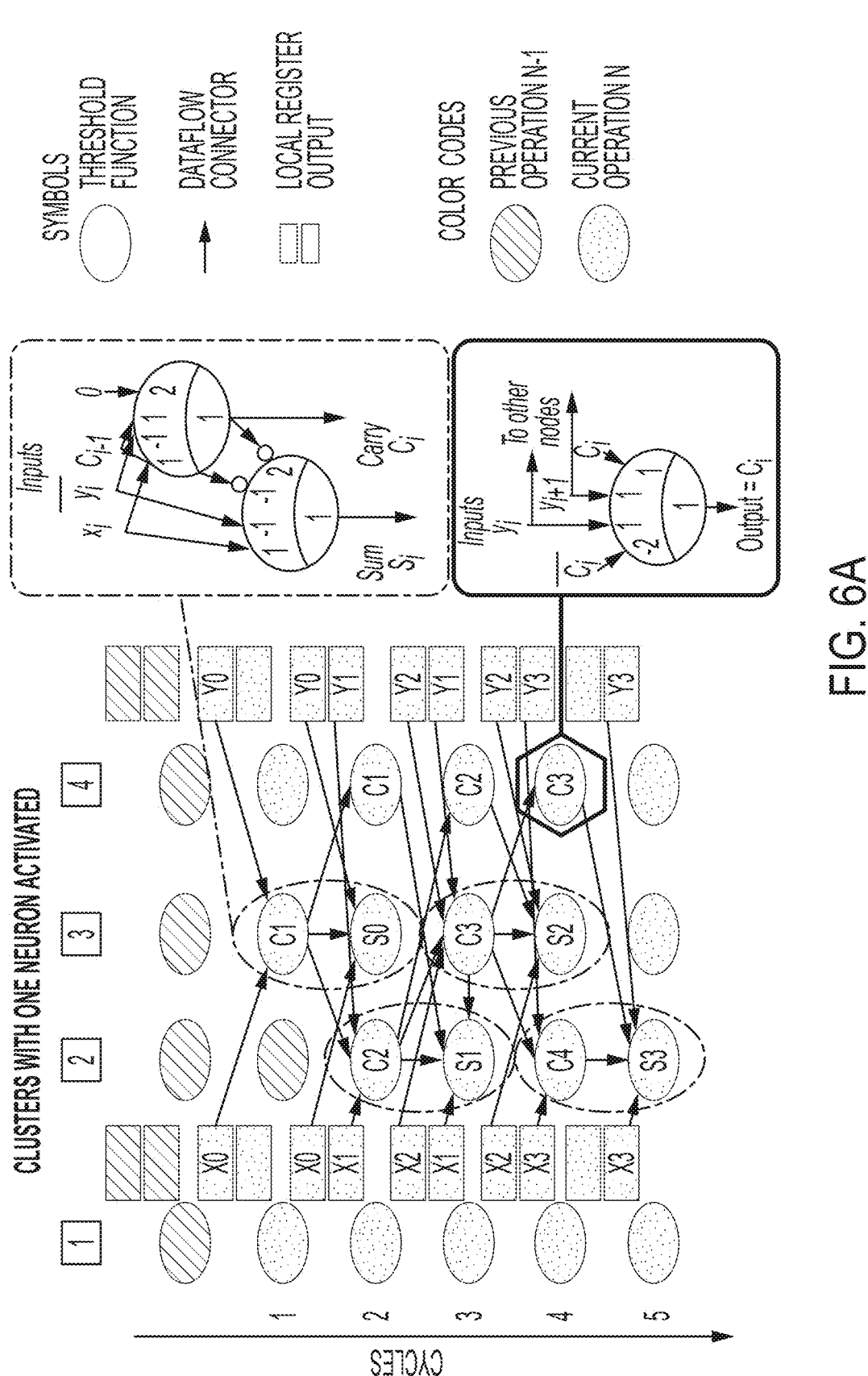
FIGS. 6A-6E show an addition operation with one bit per cycle, according to an embodiment of the present disclosure.
Figure 6B:
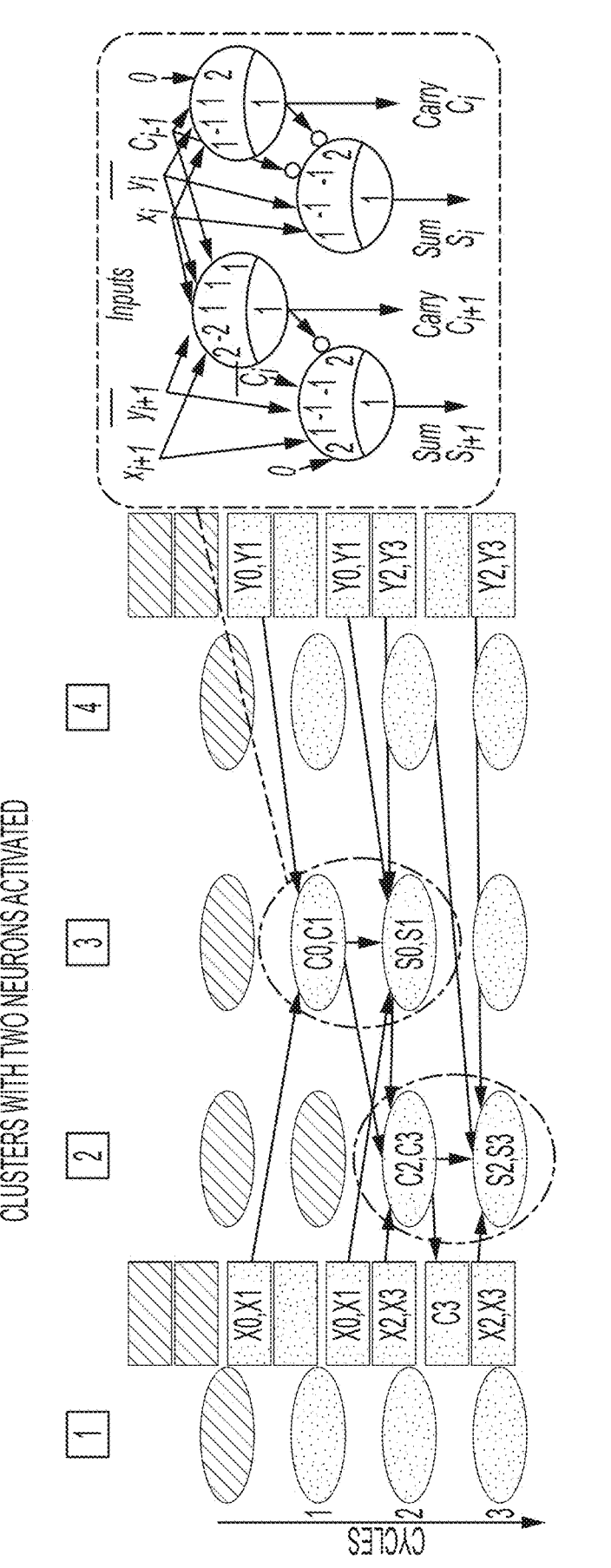
Figure 6D:
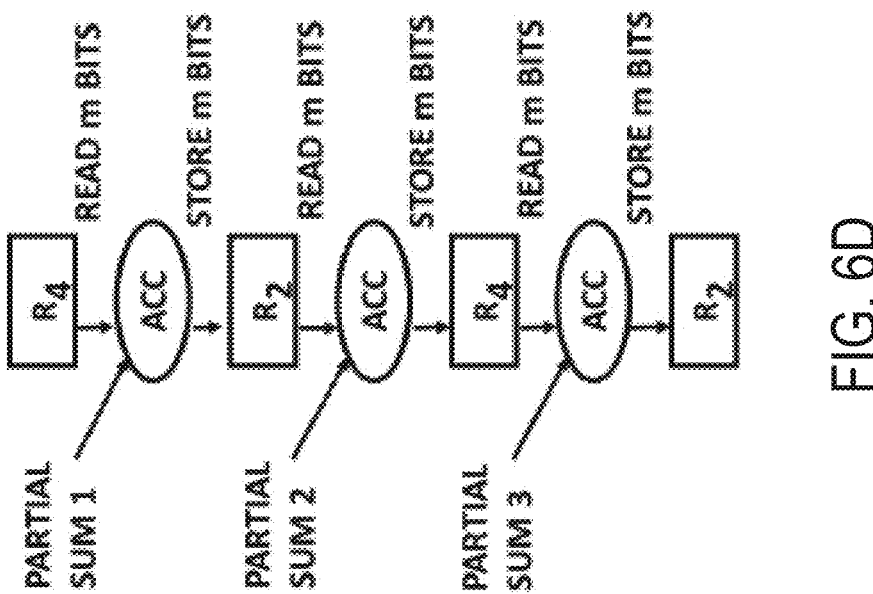
Figure 6C:
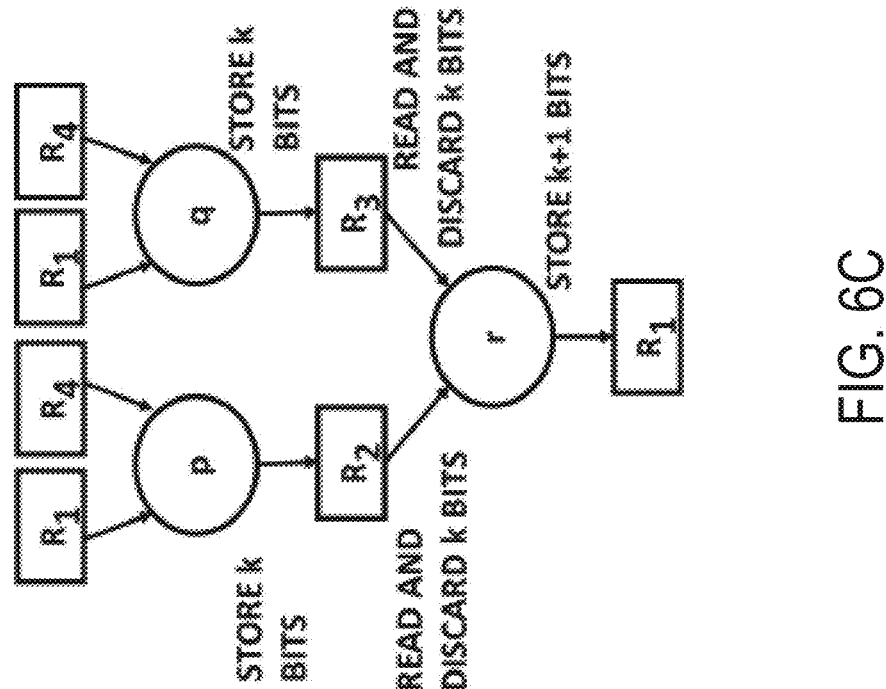
Figure 6E:
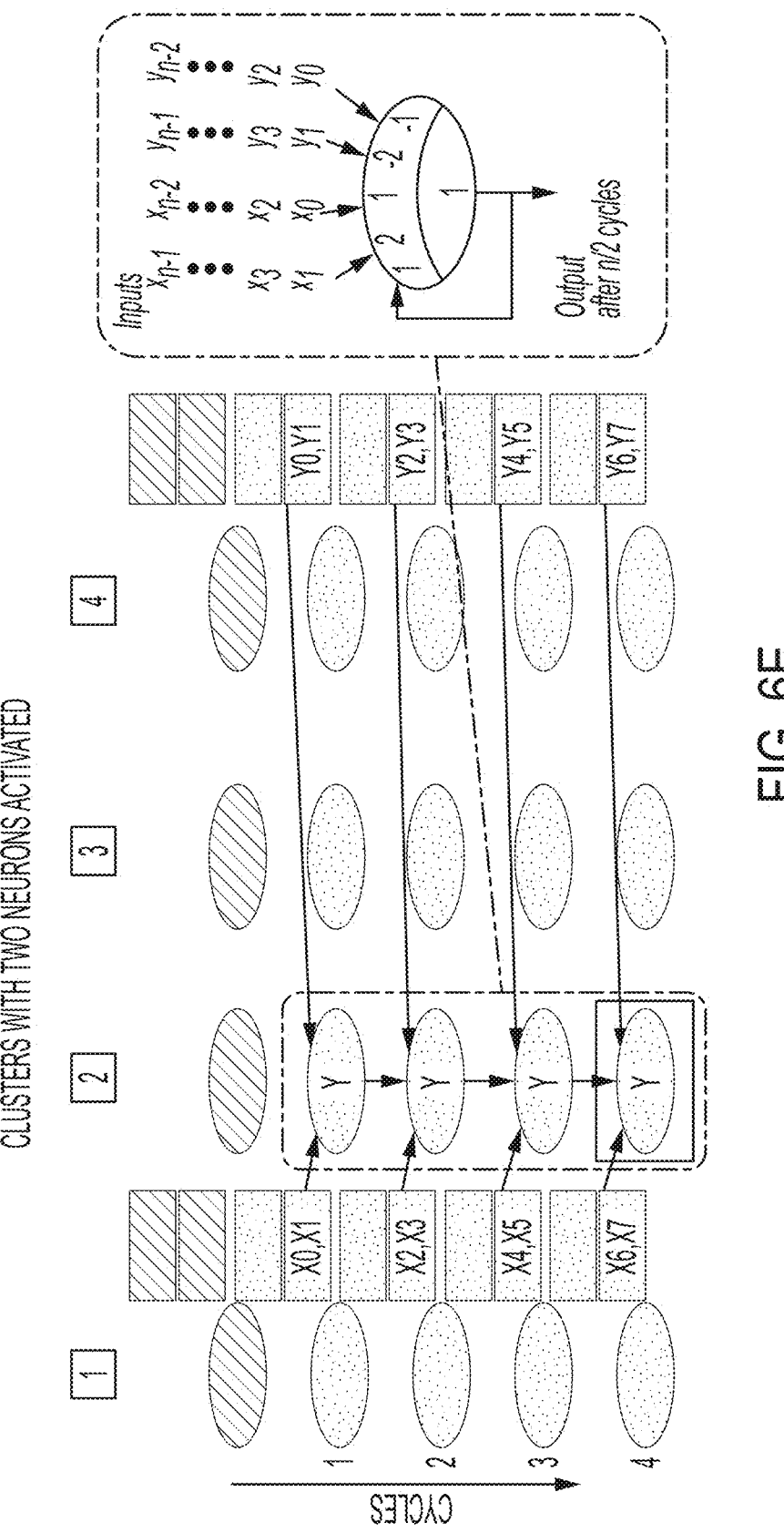

FIGS. 6A-6E show an addition operation with one bit per cycle (FIG. 6A), an addition operation with two bits per cycle (FIG. 6B), an adder-tree (FIG. 6C), an accumulation operation (FIG. 6D), and a comparison operation (FIG. 6E) using the processing element architecture of the system for quantized neural network inference. Depending on the number of neurons available in each cluster, the scheduler can automatically tune the schedule for the best performance. FIGS. 6A and 6B show how the schedule of an addition operation can be varied based on the available neurons (denoted by K). For example, if an addition operation of two 4-bit numbers, X and Y, is to be executed, then the processing element uses five cycles (4 cycles before the next primitive can be launched) to finish its addition operation if only one neuron (K=1) is enabled in each cluster. However, if the number of neurons in each cluster is doubled (K=2), the schedule can be re-adjusted to finish the addition operation in three cycles (2 cycles before the next primitive can be launched). If all five neurons are enabled in each cluster, then the processing element would only require two cycles (1 cycle before the next primitive can be launched) to finish the addition operation. This feature enables a run-time trade-off between delay and energy efficiency on the processing element. Furthermore, if some neurons in the manufactured chip stop working, those neurons may be bypassed by modifying the schedule.

Figures 7A, 7B:
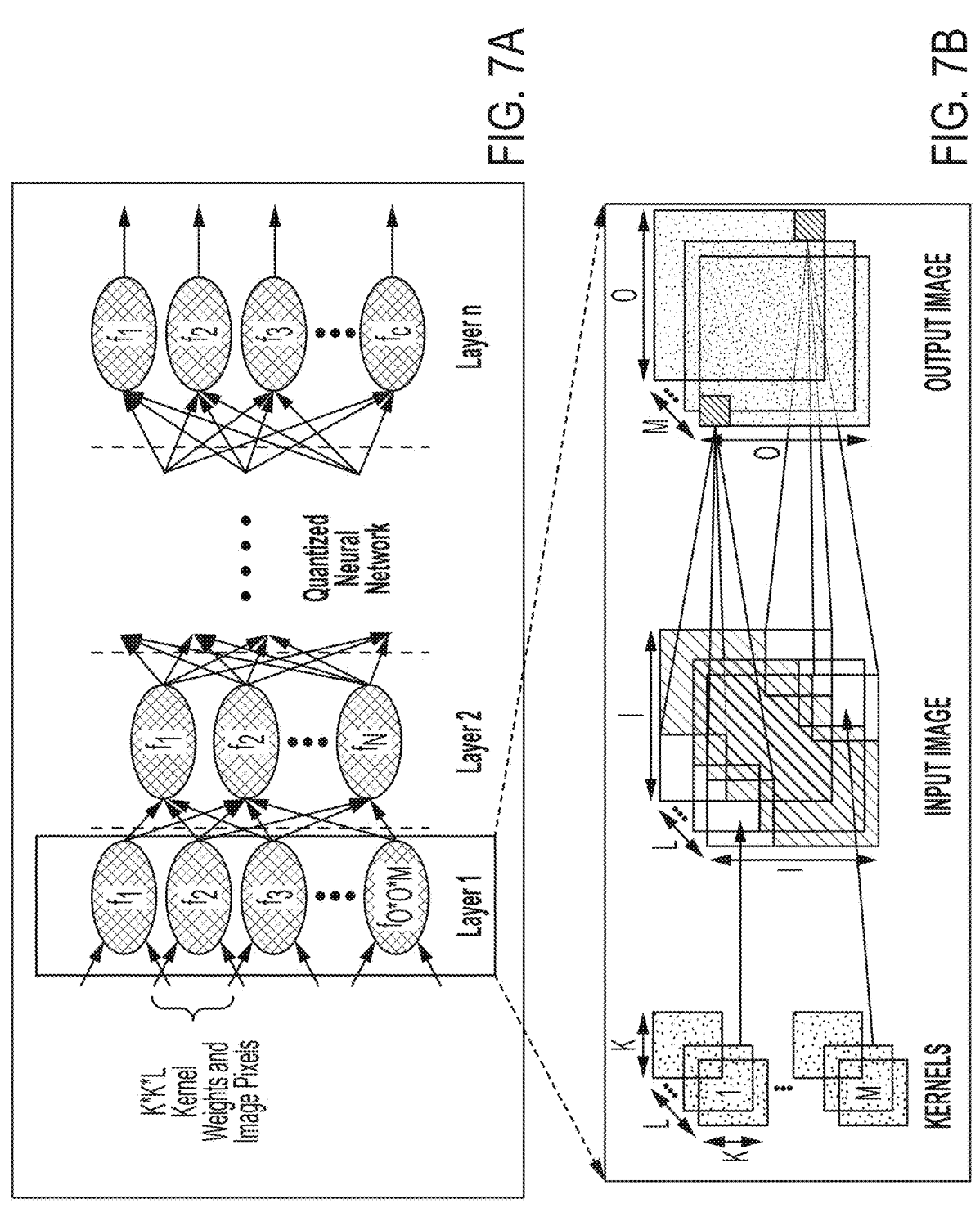
FIG. 7A shows a representation of a quantized neural network as a directed acyclic graph, according to an embodiment of the present disclosure.
FIG. 7B shows data reuse opportunities in a two-dimensional convolution operation, according to an embodiment of the present disclosure.

A complete QNN may be mapped on the system for quantized neural network inference as follows. The present disclosure describes, above, how a single QNN node, which is a DAG of operations, may be executed on a single processing element. The following portion of the disclosure presents the final step of mapping QNN nodes to the system for quantized neural network inference array, taking into account the specific structure of the QNN (e.g., how many layers the QNN includes, and how many nodes it has in each layer), which is shown in FIGS. 7A and 7B. FIG. 7A shows a representation of QNN as a directed acyclic graph (DAG) and FIG. 7B shows data reuse opportunities in a two dimensional convolution operation. Although the QNN may be a DAG, its nodes are arranged in layers with all nodes in a layer performing the same function, but on different inputs. Because the computations may proceed layer by layer, the main goal of improving energy efficiency and latency may be achieved by maximizing the data reuse.

An example of a QNN that performs a 2D convolution is illustrated in FIG. 7B. The dimensions of the input image are (I, I, L), and the dimensions of the output image are (O, O, M) and the dimensions of the array of weights are (K, K, L, M). Each pixel in the output image represents a node in a QNN. For this convolution, the opportunities for data reuse (sharing) are as follows:

1) Each input pixel may be reused $$\left\lfloor \frac{K^2 O^2}{I^2} \right\rfloor$$

times when computing one dimension of the output image.
2) Each kernel weight may be reused $O^2$ times.
3) Each dimension of the input (L) may be reused M times.

However, since the data and computation resources required for an arbitrary layer of a QNN may exceed what may be available on the system for quantized neural network inference, the nodes of a QNN may be scheduled so that the cost of re-fetching inputs and weights to the cache from off-chip memory may be minimized, subject to the following constraints:

1) The system includes a 2-D array of processing elements operating in a SIMD fashion, such that the processing elements in the same row share input pixels, and processing elements in the same column share weights.
2) The cache for storing input pixels has a fixed size.
3) The cache for storing weights has a fixed size.

Figure 8A:
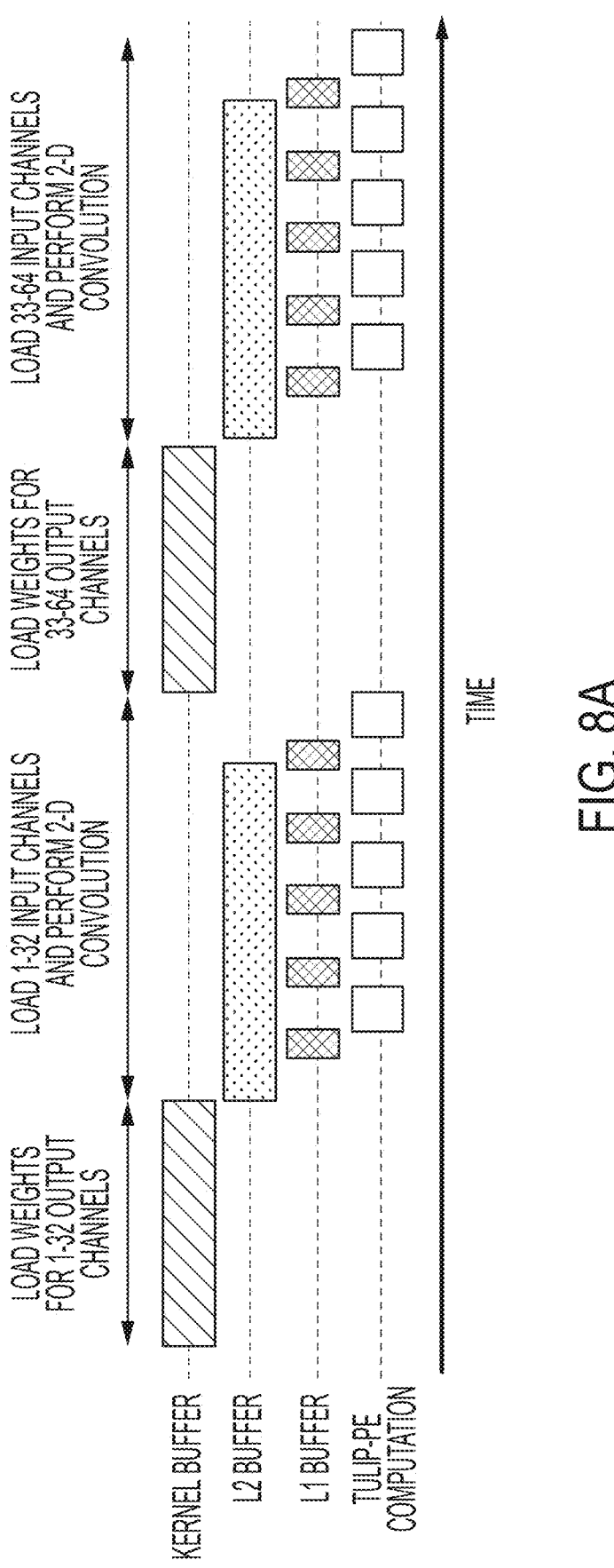
FIG. 8A is an illustration of the schedule for a convolution layer of a quantized neural network, according to an embodiment of the present disclosure.

An illustration of the schedule for the convolution layer of a QNN is shown in FIGS. 8A and 8B. Given an image and kernel buffers of a given capacity, a subset of the required data (image pixels and weights) for a convolution operation may be loaded from external memory. The computation on the processing elements may be started as soon as the required data is available and partial results are computed. To complete the convolution operation across all input channels (L) and output channels (M), new input pixels and kernels are loaded to the respective on-chip buffers replacing the previous data. The system for quantized neural network inference has R rows with C processing elements (columns) which share image pixels along the row and weights along the column.

A quantitative analysis may be employed to show how the use of processing elements enhances data reuse, as compared to a MAC unit. This may be done by comparing the delay and area complexity when using processing elements and when using MACs. If m and n are the number of bits needed to represent inputs and weights respectively, then to multiply N pairs of weights and inputs, the area complexity of the MAC unit may be O(mn), whereas for a processing element it may be O(1). The area complexity of a processing element may be a constant because it performs multiplication sequentially, in a bit-sliced manner. The delay complexity of the MAC unit may be O(N) and that of the processing element may be O(mnN). Although the processing element may be smaller, it may be much slower than a MAC unit. However, as explained below, these trade-offs change when MACs and processing elements are used in a SIMD architecture.

For example, two SIMD architectures may be compared, a first of which is the baseline architecture for reference, which consists of a row of C MAC units, and a second of which is the system for quantized neural network inference architecture, with a grid of R×C processing elements. The baseline has a gate complexity of O(Cmn) and a delay complexity of O(N=C). Similarly, the system for quantized neural network inference has a gate complexity of O(CR) and a delay complexity of O(mnN/CR). The system for quantized neural network inference can match the area and delay of the baseline by setting R=mn. However, the system for quantized neural network inference may be still better than the baseline because the grid arrangement provides higher opportunities for weight reuse. Assuming that a workload of R C graphs will be processed by both the architectures, the baseline may fetch each weight R times whereas the system for quantized neural network inference may fetch each weight just once. As a result, significant energy-efficiency improvements may be achieved by enhancing data reuse. The complexity analysis discussed above is summarized in Table III (the table of FIG. 8B).

Table III shows gate and delay complexity of MAC units and processing elements. Processing elements match the delay and gate complexity of MAC units when R=mn. However, since there are now R processing elements for every MAC unit, the increased parallelism promotes data sharing, thereby improving data reuse by a factor of R.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-{}^{35}\!/_{100})$ times 10) and the recited maximum value of 13.5 (i.e., $(1+{}^{35}\!/_{100})$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of a quantized neural network circuit have been specifically described and illustrated herein, many modifications and variations will be apparent to those skilled in the art. Accordingly, it is to be understood that a quantized neural network circuit constructed according to principles of this disclosure may be embodied other than as specifically described herein. The invention is also defined in the following claims, and equivalents thereof.

What is claimed is:

1. A system, comprising:

a neuron processing element, the neuron processing element comprising a first neuron cluster and a second neuron cluster, the first neuron cluster comprising:

a first binary neuron, having a first input network with a first number of inputs;

a second binary neuron, having a first input network with a second number of inputs, the second number being different from the first number;

a plurality of multiplexers, each having an output connected to a respective input of the inputs of the first input network of the first binary neuron; and a plurality of flip-flops, each having an output connected to an input of a respective multiplexer of the plurality of multiplexers.

2. The system of claim 1, wherein the first input network of the first binary neuron is a left input network of the first binary neuron.

3. The system of claim 2, wherein the first binary neuron further comprises a second input network, the second input network being a right input network of the first binary neuron.

4. The system of claim 3, wherein the second input network of the first binary neuron has the same number of inputs as the first input network of the first binary neuron.

5. The system of claim 1, wherein the first number is 6 and the second number is 5.

6. The system of claim 1, wherein the first neuron cluster comprises 5 binary neurons, including the first binary neuron and the second binary neuron.

7. The system of claim 6, wherein a third binary neuron of the 5 binary neurons has a first input network with 4 inputs.

8. The system of claim 7, wherein a fourth binary neuron of the 5 binary neurons has a first input network with 3 inputs.

9. The system of claim 8, wherein a fifth binary neuron of the 5 binary neurons has a first input network with 3 inputs.

10. The system of claim 1, wherein the neuron processing element further comprises a third neuron cluster and a fourth neuron cluster.

11. The system of claim 1, comprising a plurality of neuron processing elements including the neuron processing element.

12. The system of claim 11, further comprising:

a first image buffer; and a kernel buffer, the first image buffer being configured to feed image data to the neuron processing elements, and the kernel buffer being configured to feed kernel data to the neuron processing elements.

13. The system of claim 12, wherein the neuron processing elements are configured to perform quantized neural network inference operations based on the image data and the kernel data.

14. The system of claim 13, further comprising a processing unit controller, the processing unit controller being connected to control inputs of the multiplexers.

15. The system of claim 14, further comprising a second image buffer, connected to the first image buffer.

16. The system of claim 15, further comprising a memory controller, configured to control the kernel buffer, the first image buffer, and the second image buffer.

17. The system of claim 14, wherein the first image buffer, the kernel buffer, the processing unit controller, and the neuron processing elements are on one integrated circuit chip.

18. A method, comprising:

realizing a node of a quantized neural network on the system of claim 1, the realizing comprising:

mapping a plurality of operations corresponding to a neural network inference operation to:

a plurality of resources, and a plurality of time steps, wherein each of the resources is a register of a neuron cluster.

19. The method of claim 18, wherein the mapping comprises minimizing a cost function subject to a plurality of constraints, the cost function being a function of an execution time of the neural network inference operation.

20. The method of claim 19, wherein:

the minimizing comprises using integer linear programming, and the mapping satisfies one or more routing constraints.

* * * * *